US012627661B2

(12) United States Patent
Adharapurapu et al.

(10) Patent No.: US 12,627,661 B2
(45) Date of Patent: May 12, 2026

(54) ENHANCED NETCONF ACCESS CONTROL MODEL (NACM) OPERATIONS AND GRANULAR CONTROLS FOR SHARED DATA NODE MANAGEMENT

(71) Applicant: RAKUTEN SYMPHONY, INC., Tokyo (JP)

(72) Inventors: Krishna Pramod Adharapurapu, Bangalore (IN); Nagendra Bykampadi, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 341 days.

(21) Appl. No.: 18/191,848

(22) Filed: Mar. 28, 2023

(65) Prior Publication Data

US 2024/0333712 A1 Oct. 3, 2024

(51) Int. Cl.
  *H04L 9/40* (2022.01)

(52) U.S. Cl.
  CPC ................................. *H04L 63/0876* (2013.01)

(58) Field of Classification Search
  CPC ..................................................... H04L 63/0876
  See application file for complete search history.

(56) References Cited

U.S. PATENT DOCUMENTS

| | | | | | |
|---|---|---|---|---|---|
| 9,185,170 | B1 * | 11/2015 | Grammel | ................ | H04L 67/59 |
| 9,985,872 | B2 * | 5/2018 | Jaffer | .................... | H04L 67/142 |
| 10,841,206 | B2 * | 11/2020 | Menon | .................... | H04L 43/20 |
| 2012/0266209 | A1 * | 10/2012 | Gooding | ................ | H04L 63/20 |
| | | | | | 726/1 |
| 2018/0091557 | A1 * | 3/2018 | Komu | .................... | H04L 63/08 |
| 2019/0081889 | A1 * | 3/2019 | Fieau | ....................... | H04L 45/22 |
| 2021/0314211 | A1 * | 10/2021 | Grayson | ............. | H04L 41/0213 |
| 2023/0046743 | A1 * | 2/2023 | Vaez-Ghaemi | .... | H04B 17/0085 |
| 2024/0223445 | A1 * | 7/2024 | Pawar | ................. | H04L 41/0213 |
| 2024/0224122 | A1 * | 7/2024 | Madan | .................... | H04W 4/50 |
| 2025/0080979 | A1 * | 3/2025 | Chintan Shah | ..... | H04L 63/0823 |

OTHER PUBLICATIONS

Enns, et al.; RFC 6241 Network Configuration Protocol (NETCONF); Internet Engineering Task Force (IETF); Jun. 2011; 113 pages (Year: 2011).*

* cited by examiner

*Primary Examiner* — Oleg Survillo
(74) *Attorney, Agent, or Firm* — HAUPTMAN HAM, LLP

(57) ABSTRACT

Systems and methods for handling and/or managing permissions data nodes across multiple NETCONF clients by generating or obtaining, by a NETCONF client, a first identifier, wherein the first identifier uniquely identifies the NETCONF client, establishing a first NETCONF session between a NETCONF server and the NETCONF client, wherein the NETCONF server comprises a first O-RU, wherein the NETCONF client comprises a first O-DU, delivering, from the NETCONF client to the NETCONF server, a first request during a NETCONF session handshake comprising the first identifier, delivering, from the NETCONF client to the NETCONF server, a first edit configuration request or payload, wherein the first edit configuration request or payload comprises the first identifier.

20 Claims, 14 Drawing Sheets

300A

400A

500A

600A

600B

700A

ENHANCED NETCONF ACCESS CONTROL MODEL (NACM) OPERATIONS AND GRANULAR CONTROLS FOR SHARED DATA NODE MANAGEMENT

TECHNICAL FIELD

This description relates to enhanced NETCONF access control model (NACM) operations relating to Open Radio Access Network (O-RAN) units and granular control for shared data node management.

BACKGROUND

Open Radio Access Network (O-RAN) is a technology that aims to create more open and interoperable cellular networks. O-RAN is an evolution of Radio Access Network (RAN) architecture. In some instances, O-RAN is controlled by a single operator.

The O-RAN architecture uses a distributed system of intelligent software agents, known as "white boxes," to control the network. This allows for greater scalability and the ability to use a variety of different hardware components from different vendors.

O-RAN provides the ability to easily add new features and capabilities to the network by use of software-defined networking (SDN) and network functions virtualization (NFV) technologies.

O-RAN also helps to reduce costs for operators by allowing for the use of cheaper and more efficient hardware components. This helps to lower costs, which are potentially a barrier to the deployment of cellular networks.

Some elements of the O-RAN architecture include the Service Management and Orchestration Framework (SMO), RAN Intelligent Controller (RIC), O-Cloud, O-RAN central unit (O-CU or OCU), O-RAN distributed unit (O-DU or ODU), and O-RAN Radio unit (O-RU or ORU).

A control plane (C-plane) is responsible for signaling and control operations in the network by communicating with other network elements to coordinate and control various functions, such as call setup, mobility management and network resource allocation.

A user plane (U-plane) is responsible for delivering data and voice services to the end-users by transporting the actual user traffic between the radio access network and the core network.

A management plane (M-plane) provides centralized management and monitoring of the network elements, as well as configuration and maintenance of the network. The M-plane is responsible for monitoring the health and performance of the network, collecting statistics, and managing software upgrades and other network changes.

O-RAN provides a more secure network by separating the control plane and the data plane. This allows for greater flexibility in the deployment of security measures, such as firewalls, intrusion detection systems, and encryption.

SUMMARY

An aspect of this description relates to a system. The system includes a non-transitory computer readable medium configured to store instructions thereon. The system includes a processor connected to the non-transitory computer readable medium. The processor is configured to execute the instructions comprising generating or obtaining, by a NET-CONF client, a first identifier, wherein the first identifier uniquely identifies the NETCONF client, establishing a first NETCONF session between a NETCONF server and the NETCONF client, wherein the NETCONF server comprises a first O-RU, wherein the NETCONF client comprises a first O-DU, delivering, from the NETCONF client to the NET-CONF server, a first request during a NETCONF session handshake comprising the first identifier, delivering, from the NETCONF client to the NETCONF server, a first edit configuration request or payload, wherein the first edit configuration request or payload comprises the first identifier.

An aspect of this description relates to a method. The method includes generating or obtaining, by a NETCONF client, a first identifier, wherein the first identifier uniquely identifies the NETCONF client, establishing a first NET-CONF session between a NETCONF server and the NET-CONF client, wherein the NETCONF server comprises a first O-RU, wherein the NETCONF client comprises a first O-DU, delivering, from the NETCONF client to the NET-CONF server, a first request during a NETCONF session handshake comprising the first identifier, delivering, from the NETCONF client to the NETCONF server, a first edit configuration request or payload, wherein the first edit configuration request or payload comprises the first identifier.

An aspect of this description relates to a non-transitory computer readable medium configured to store instructions. The instructions when executed cause a processor to execute the instructions comprising generating or obtaining, by a NETCONF client, a first identifier, wherein the first identifier uniquely identifies the NETCONF client, establishing a first NETCONF session between a NETCONF server and the NETCONF client, wherein the NETCONF server comprises a first O-RU, wherein the NETCONF client comprises a first O-DU, delivering, from the NETCONF client to the NETCONF server, a first request during a NETCONF session handshake comprising the first identifier, delivering, from the NETCONF client to the NETCONF server, a first edit configuration request or payload, wherein the first edit configuration request or payload comprises the first identifier.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
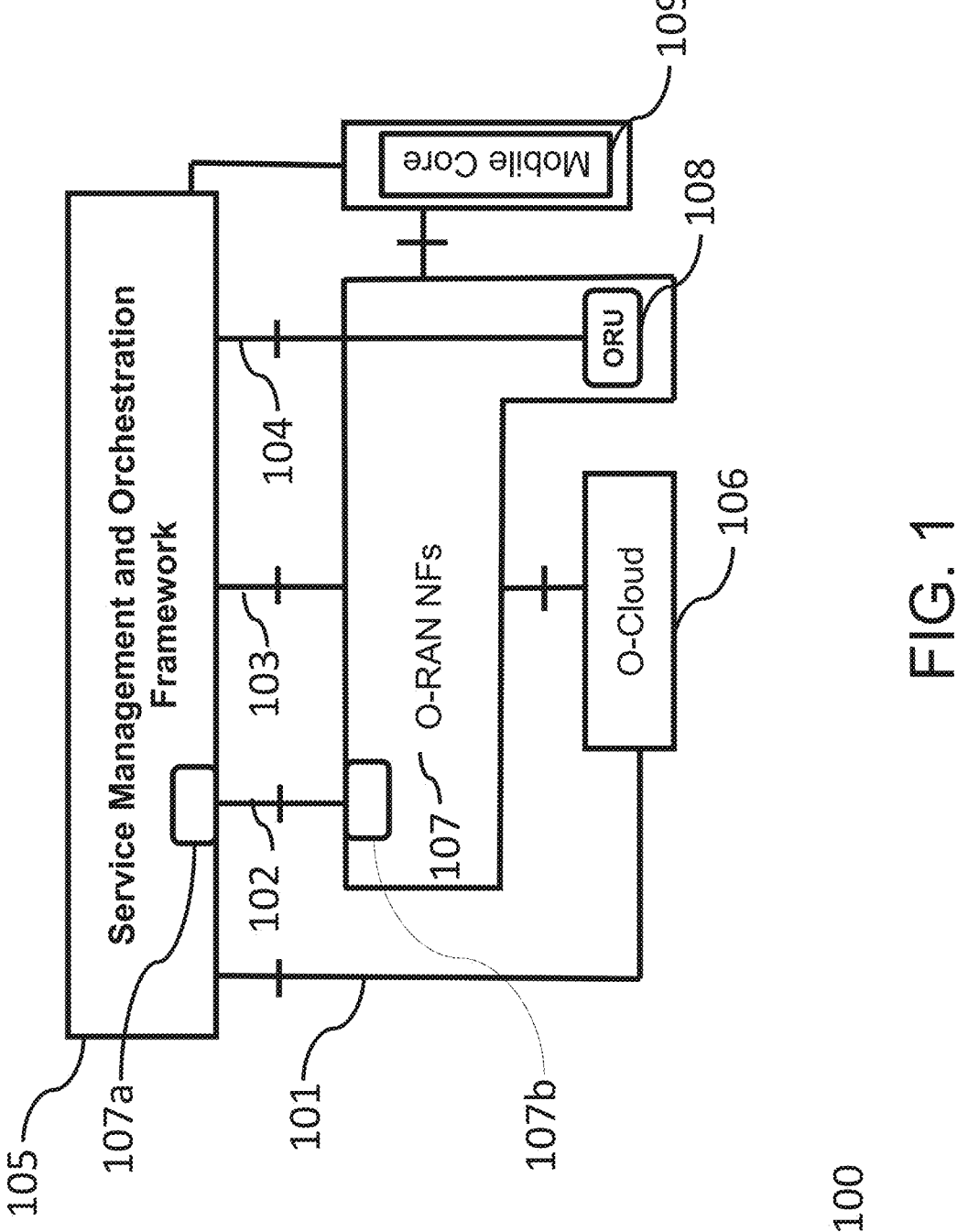
FIG. 1 is a schematic diagram of an O-RAN system, according to some embodiments of the subject disclosure.

The following disclosure provides many different embodiments, or examples, for implementing different fea-tures of the provided subject matter. Specific examples of components, values, operations, materials, arrangements, or the like, are described below to simplify the present disclo-sure. These are, of course, merely examples and are not intended to be limiting. Other components, values, opera-tions, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present dis-closure may repeat reference numerals and/or letters in the various examples. This repetition is for the purpose of simplicity and clarity and does not in itself dictate a rela-tionship between the various embodiments and/or configu-rations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accord-ingly.

NETCONF access control model (NACM) rules for NET-CONF servers do not support a way to share data nodes across multiple NETCONF clients with sufficient client controls, permissions, and/or privileges. For example, there is no system or method that allows NETCONF clients to exert granular control of data node instances, own instances under a data node, and perform CRUDX operations (Create, Read, Update, Delete and eXec) targeted to owned data node instances. In some cases, the YANG data modeling language is used to define a hierarchical data structure and used for operations based on network configuration management protocols (such as NETCONF/RESTCONF). But, in a YANG model, there is no way for a list data node to distinguish whether an entry in the list is owned by a NETCONF client and manages CRUDX access to the list entry based on permissions, privileges, and/or access rights to the list entry to perform allowed operations.

In an O-RAN example, a shared O-RU network element is shared across different O-DUs and Service Management & Orchestrators (SMOs) belonging to different shared resource owners (SROs) or tenants. Each shared O-RU network element is assignable to an SRO, tenant, or owner ID for management of the shared O-RU. During update operations, storing shared resource owner IDs (owner-IDs) in each of the data instances and/or reference or check owner-IDs stored in the data instances is inefficient.

Storing owner-IDs in each of the data node instances makes the entries complex structures even when a list entry is of a basic data type (such as string or integer). Storing owner-IDs in each of the data node instances would also include unnecessary storage of an SRO-ID per instance because the placement of owner-ID in the YANG model is defined by the YANG author and owner-ID maintenance would not be controlled from a NETCONF server hosted on a shared O-RU. YANG models do not provide for identifi-cation of shared resources. Further, there would be no efficient mechanism to obtain an owner-ID by a tenant or shared resource owner, to update an owner-ID for a data node instance, to relinquish or change the ownership of data node instances, or to optimize storage of owner-IDs by a NETCONF server.

Further, storing owner-IDs in each of the data node instances increases a risk of a data leak or security vulner-ability, since the owner-ID and ownership status is not data that should be open or available in the data model (owner-ID confidentiality would not be maintained), in some instances. There are no efficient counter measures to prevent an owner or user using another owner's owner-ID. For example, any party with write access has permission to modify an owner-ID if such an ID is simply placed in an accessible data model. Thus, the lack of sufficient client controls, permis-sions, and/or privileges results in numerous shortcomings and inefficiencies.

Additionally, there is no support for NACM authorization control for NETCONF clients to perform CRUDX opera-tions on shared resources from NACM. CRUDX permis-sions of other shared resource owners (SRO peers) cannot be specified by the owner of the data node instance.

The current disclosure addresses and/or helps to solves these shortcomings or inefficiencies. The current disclosure provides systems and methods to efficiently track and man-age shared resource ownership in a secure manner. The current disclosure further provides systems and methods for enhanced, granular control operations related to such man-agement of resources by, for example, introducing additional resource management operations alongside CRUDX. In some examples, additional resource management operations such as Create-and-Own, Update-and-Own, Change-Own-ership and Relinquish-Ownership are defined, permitted, and/or established in or by a configuration process.

FIG. 1 is a schematic diagram of an O-RAN system 100, according to at least some embodiments of the subject disclosure.

O-RAN system 100 includes four interfaces A1 (102), O1 (103), Open Fronthaul M-plane interface (104) and O2 (101) that connect SMO (Service Management and Orchestration) 105 framework to O-RAN network functions and O-Cloud 106, a cloud computing platform comprising a collection of physical infrastructure nodes meeting O-RAN requirements to host relevant O-RAN functions. In some cases, O-RAN Network Functions 107 are VNFs (Virtualized Network Function) and/or PNFs (Physical Network Function) utilizing customized hardware Non-Real-Time RAN Intelligent Controller (Non-RT RIC) is shown at 107a, and Near-Real-Time RAN Intelligent Controller (Near-RT RIC) is shown at 107b. Near-RT RIC 107a is a logical function that enables near-real-time control and optimization of RAN elements and resources via fine-grained data collection and actions. Non-RT RIC 107b is a logical function within SMO 105 that drives the content carried across the A1 interface 102. Open Fronthaul M-plane interface (104) interfaces SMO 105 and O-RU 108. Mobile Core 109 is a bundle of functionality for authenticating devices, providing Internet (IP) connectivity, tracking user mobility, tracking subscriber usage, etc.

Figure 2:
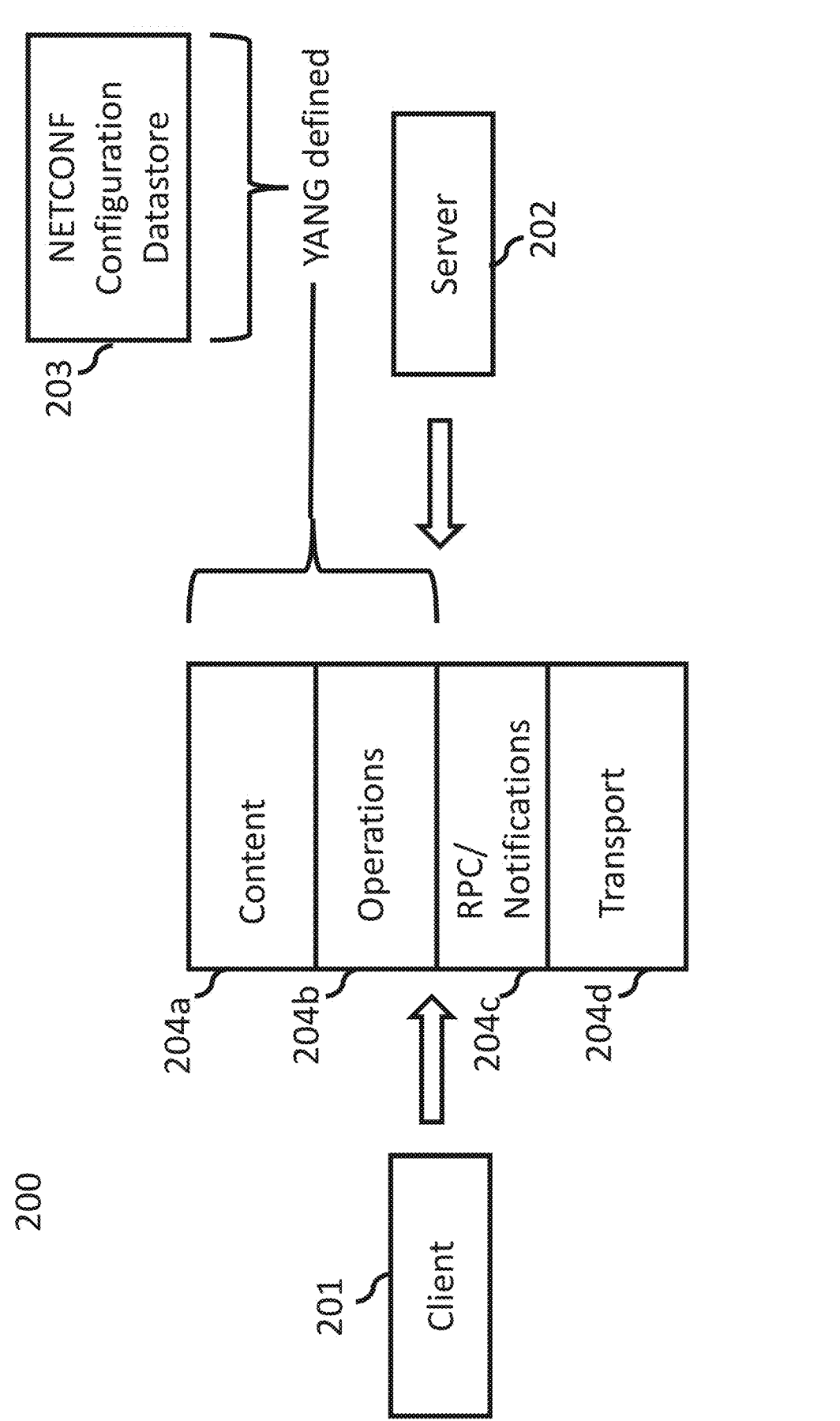
FIG. 2 is block diagram of a NETCONF client and NETCONF server interaction and/or relationship, according to some embodiments of the subject disclosure.

FIG. 2 is block diagram 200 of a NETCONF client 201 and NETCONF server 202 interaction and/or relationship according to some embodiments of the subject disclosure.

The O1 interface provides support for the NETCONF protocol, which is usable to configure and manage network elements such as Near RT-RIC, O-CU, O-DU, and O-RU. A NETCONF client 201 is configured to use data models to drive configuration and management of such network elements as RIC, CU, DU, and RU, each of which is a NETCONF server 202. As shown, NETCONF configuration datastore 203 is YANG-defined, in some embodiments. Content 204a, operations 204b, RPC/notification 204c, and transport 204d elements used in client-server interactions are shown.

In some embodiments, a shared resource owner or operator is a tenant operator or owner, such as an O-DU/O-CU operator, where an owner implements an O-CU and O-DU connected to a shared O-RU.

In at least one example, the owner/operator includes a client, such NETCONF client 201, a shared resource configuration information, or common resource data.

Figure 3A:
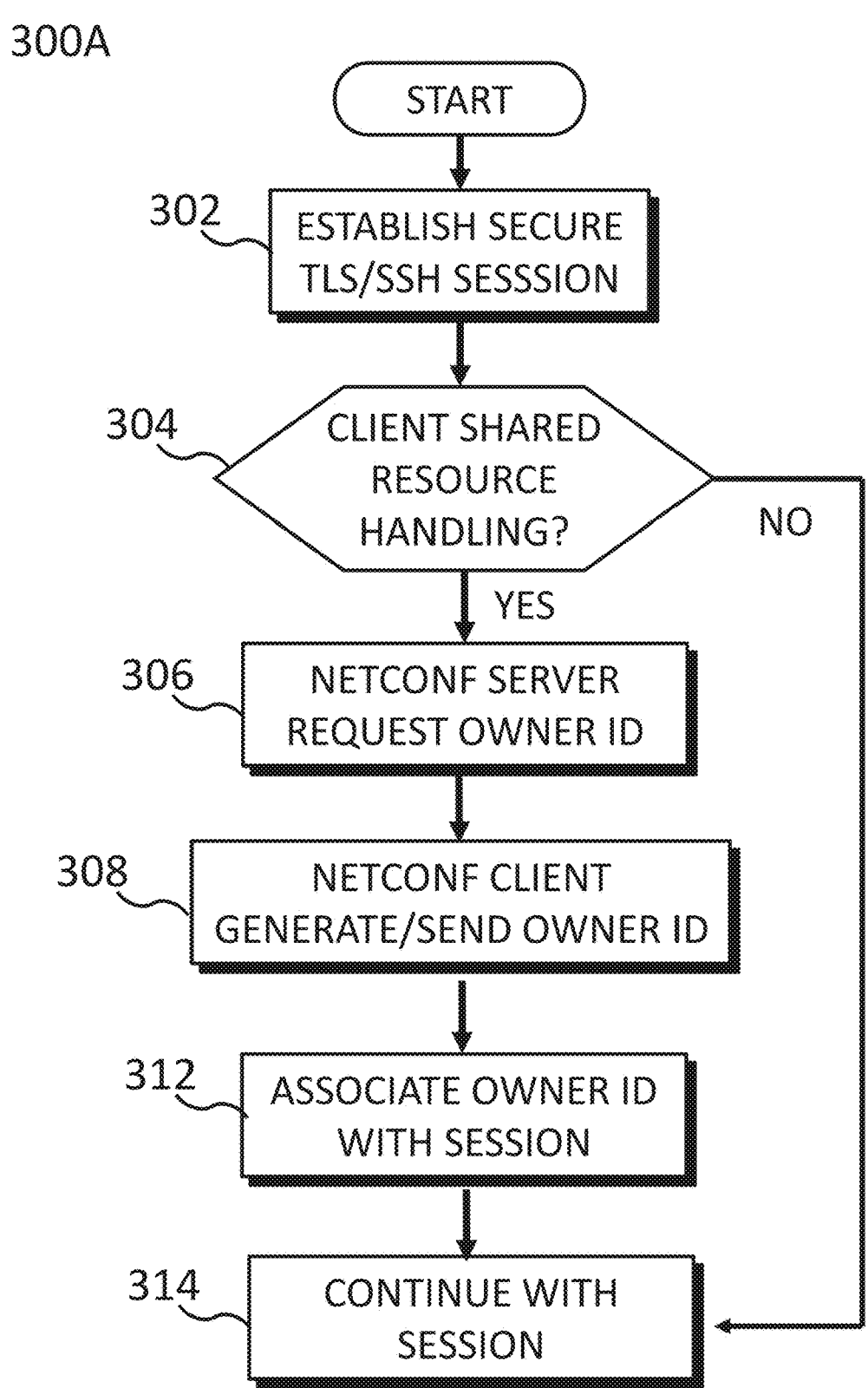
FIG. 3A is a flowchart of a NETCONF method to obtain an identifier by NETCONF server from a NETCONF client during a NETCONF session handshake, according to some embodiments of the subject disclosure.

FIG. 3A is a flowchart of a NETCONF method 300A to obtain an identifier by NETCONF server from a NETCONF client during a NETCONF session handshake, according to some embodiments of the subject disclosure. In some embodiments, NETCONF method 300A uses some or all of the infrastructure of O-RAN system 100 (FIG. 1) or the structures described in FIG. 2. In some embodiments, the method 300A is implemented using infrastructure other than the O-RAN system 100 (FIG. 1) or the structures described in FIG. 2.

In operation 302, for a NETCONF server and a NETCONF client connected and/or in communication, a secure Transport Layer Security/Secure Shell Protocol (TLS/SSH) session is established. In some embodiments, during an O-RU startup procedure, an M-Plane connection between an O-RU and NETCONF client is established, and an exchange of Transport Layer address information is carried out, including manual setting of Transport Layer addresses, allocation of Transport Layer addresses by a Dynamic Host Configuration Protocol (DHCP) server, and/or allocation of Transport Layer addresses by stateless address auto-configuration.

In operation 304, during or as a part of a NETCONF session handshake process, a query, verification, or check process is carried out to determine whether a shared resource handling capability is supported by a NETCONF client. A shared resource handling capability includes embodiments of capabilities as described herein. For example, in some embodiments, a shared resource capability is a capability to handle, store, and/or persist an owner ID in a session or as metadata. In at least one example, a request is made for a session variable and/or metadata associated with a session. In some embodiments, a session variable and/or metadata is returned, in response. In some embodiments, the request is rejected and/or returns an error or error code. In some embodiments, an indication that the session variable and/or metadata is empty is returned.

In operation 304, a branching logic is executed in response to such a query or check. For example, if a shared resource handling capability is not determined, a control or process flow continues as designed and the method 300A proceeds to operation 314. If a shared resource handling capability is determined, a control or process flow continues with additional processes or actions to establish and/or support a shared resource capability or enhancement. In this example, a request is made for a session variable, such as an owner ID, and/or metadata associated with a session. In some embodiments, a session variable and/or metadata is returned, in response. In some embodiments, the request is rejected and/or returns an error or error code. In some embodiments, an indication that the session variable and/or metadata is empty is returned. In response to a determination that a shared resource handling capability is supported, a NETCONF server requests an owner ID in operation 306.

In operation 308, in response to a NETCONF server request for owner ID, an identifier, such as an owner ID, is generated, retrieved, and/or delivered to NETCONF server. In some embodiments, an owner ID is a unique identifier that uniquely identifies an owner. In some embodiments, an identifier, such as an owner ID, is generated by a NETCONF client and/or obtained by a NETCONF client during bootstrapping (i.e., while loading of instructions during a boot-up process). In some embodiments, the owner ID is provided to the NETCONF server by the NETCONF client after generation as part of a GET ID request, or the like, during a NETCONF session handshake.

In operation 312, The owner ID is associated, stored, and/or persisted as metadata and/or a session variable of a NETCONF session that is established. In some embodiments, owner IDs are not stored at data node instances. In some embodiments, owner IDs are stored at data node instances. For example, in some embodiments, an owner ID is delivered within a request payload parameter to set a session variable associated with an owner ID.

In operation 314, after an owner ID is incorporated into a session as a session variable and/or metadata, a control or process flow continues with a session.

Figure 3B:
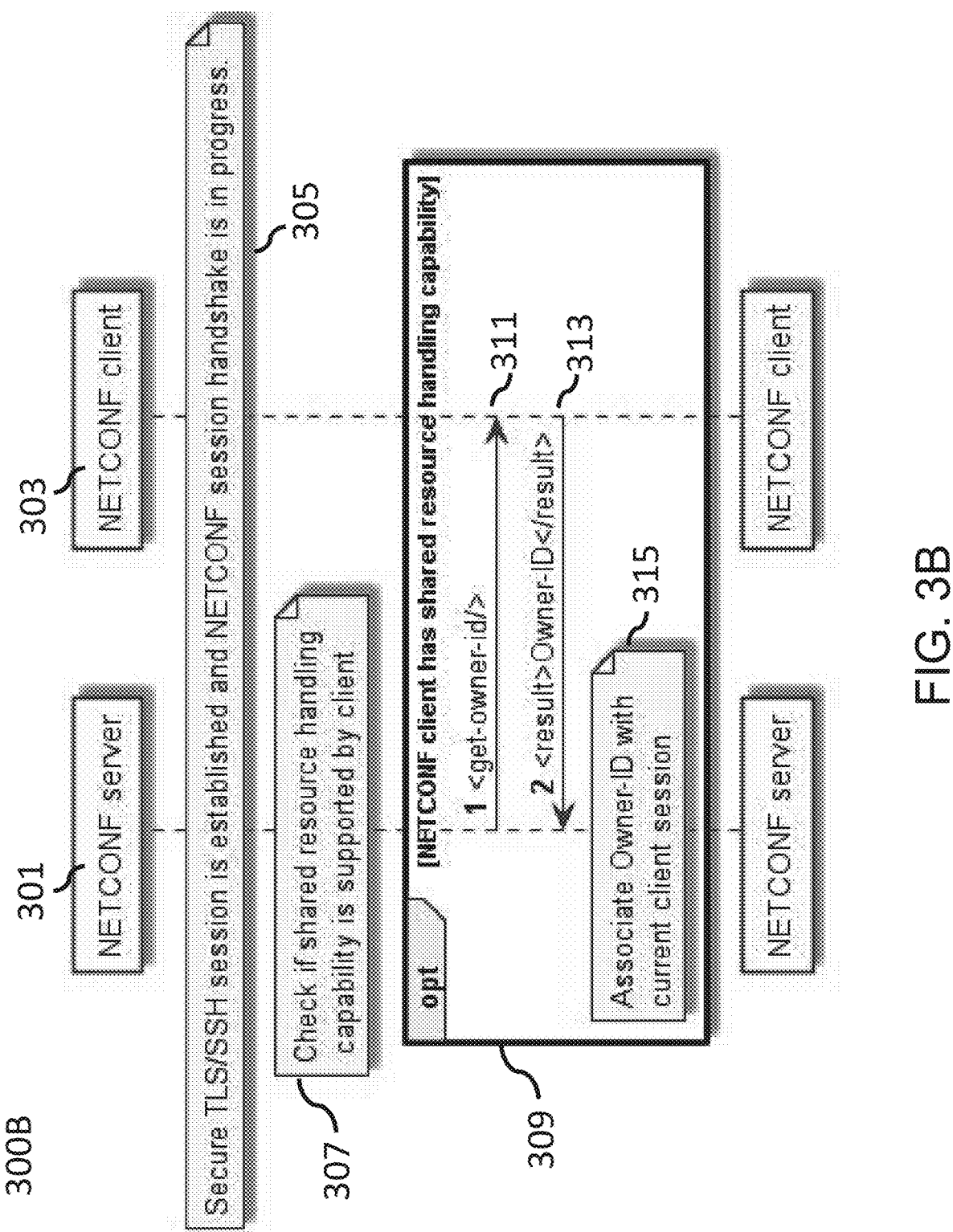
FIG. 3B is a sequence diagram of a NETCONF method to obtain an identifier by NETCONF server from a NETCONF client during a NETCONF session handshake, according to some embodiments of the subject disclosure.

FIG. 3B is a sequence diagram 300B of a NETCONF method to obtain an identifier by NETCONF server from a NETCONF client during a NETCONF session handshake, according to some embodiments of the subject disclosure Sequence diagram 300B shows an interaction, control, relationship, and/or communication flow between a NETCONF server 301 and a NETCONF client 303, according to at least some embodiments.

A secure TLS/SSH session is established and/or a NETCONF session is in progress 305. At this stage, NETCONF server 301 checks if a shared resource handling capability is supported 307 by client, such as whether an owner-ID session variable and/or owner-ID metadata management is supported and/or available. Dependency block 309 shows a sequence that is optionally carried out if a determination is made that such a capability as aforementioned is supported.

Within dependency block 309, an ID, such as an owner-ID, handling process is carried out. NETCONF server 301 requests an owner ID by a command, request, and/or configuration payload delivered to NETCONF client 303. For example, a configuration payload comprises an element including "<get-owner-id/>" as shown 311. In response, NETCONF client 303 carries out an ID generation process or otherwise retrieve an ID as an owner-ID, such as described herein. A payload is delivered including the owner-ID to NETCONF server. For example, a configuration payload comprises an element including "<result>Owner-ID</result>" as shown 313. For example, an owner-ID is generated, such as "id-abc1234" and a corresponding payload "<result>id-abc1234</result>" is delivered to NETCONF server 301. NETCONF server 301 then associates owner-ID with a current client session 315.

In some embodiments, enhanced and/or additional CRUDX operations are disclosed. In some examples, additional operations such as Create-and-Own, Update-and-Own, Change-Ownership and Relinquish-Ownership are defined, permitted, and/or established in or by a configuration process.

Create-and-Own

In some embodiments, a create-and-own privilege, permission, and/or operation is disclosed. A create-and-own operation indicates that data nodes and data node instances being created should be associated with the owner-ID of the client performing the create-and-own operation. In some embodiments, SRO privileges and/or permissions to perform CRUDX operations on the data node instances are also specified along with this operation.

Figure 4A:
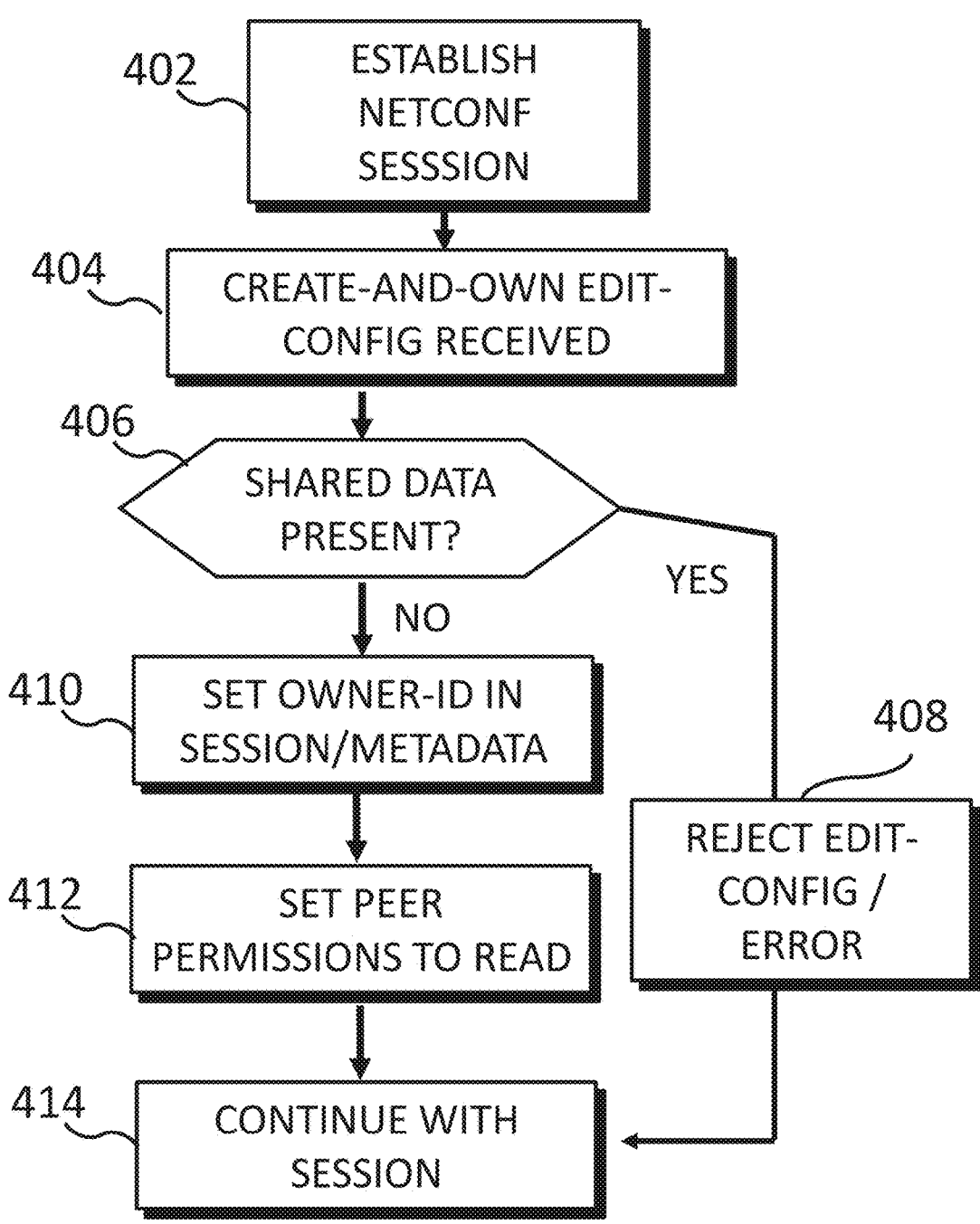
FIG. 4A is a flowchart of a method to create a shared data node instance using Create-and-Own operation, according to some embodiments of the subject disclosure.

FIG. 4A is a flowchart showing a method 400A to create a shared data node instance using a create-and-own operation, according to at least some embodiments of the subject disclosure.

In operation 402, for a NETCONF server and a NETCONF client are connected and/or in communication, a secure TLS/SSH session is established. In some embodiments, during an O-RU startup procedure, an M-Plane connection between an O-RU and NETCONF client is established, and an exchange of Transport Layer address information is carried out, including manual setting of Transport Layer addresses, allocation of Transport Layer addresses by a Dynamic Host Configuration Protocol (DHCP) server, and/or allocation of Transport Layer addresses by stateless address auto-configuration.

In operation 404, a NETCONF client delivers a command, request, and/or payload attempting to establish, create, and/or edit a configuration to a NETCONF server. In some cases, a NETCONF client delivers a command, request, and/or payload attempting to establish, create, and/or edit a configuration to introduce or establish an operation. For example, a "create-and-own" operation configuration payload is delivered. A "peer-permissions" parameter is specified. In one example, a "read" permission is specified in configuration payload as "peer-permissions=R".

In operation 406, in response to receiving shared data, which indicates a shared resource capability, a NETCONF server determines whether any shared data is already present, is used to indicate that a configuration has already been carried out and or that peer ownership already exists and/or has been established.

In operation 408, in a case wherein shared data is already present at the NETCONF server and/or in a session or metadata, a command, request, and/or payload attempting to establish, create, and/or edit a configuration rejected by, for example, returning an error code, message, and/or tag.

In operation 412, in a case wherein shared data is not already present at the NETCONF server and/or in a session or metadata, a command, request, and/or payload attempting to establish, create, and/or edit a configuration, entry into or initiation of a branching logic or dependency control flow or sequence is triggered. For example, an owner-ID corresponding to an owner-ID as described in 300A or 300B is saved as a session variable and/or as metadata. Further, a peer permission level or the like is retrieved from the request and/or payload 404 and similarly set.

In operation 414, after shared data is established and/or set, a control flow continues with a session.

Figure 4B:
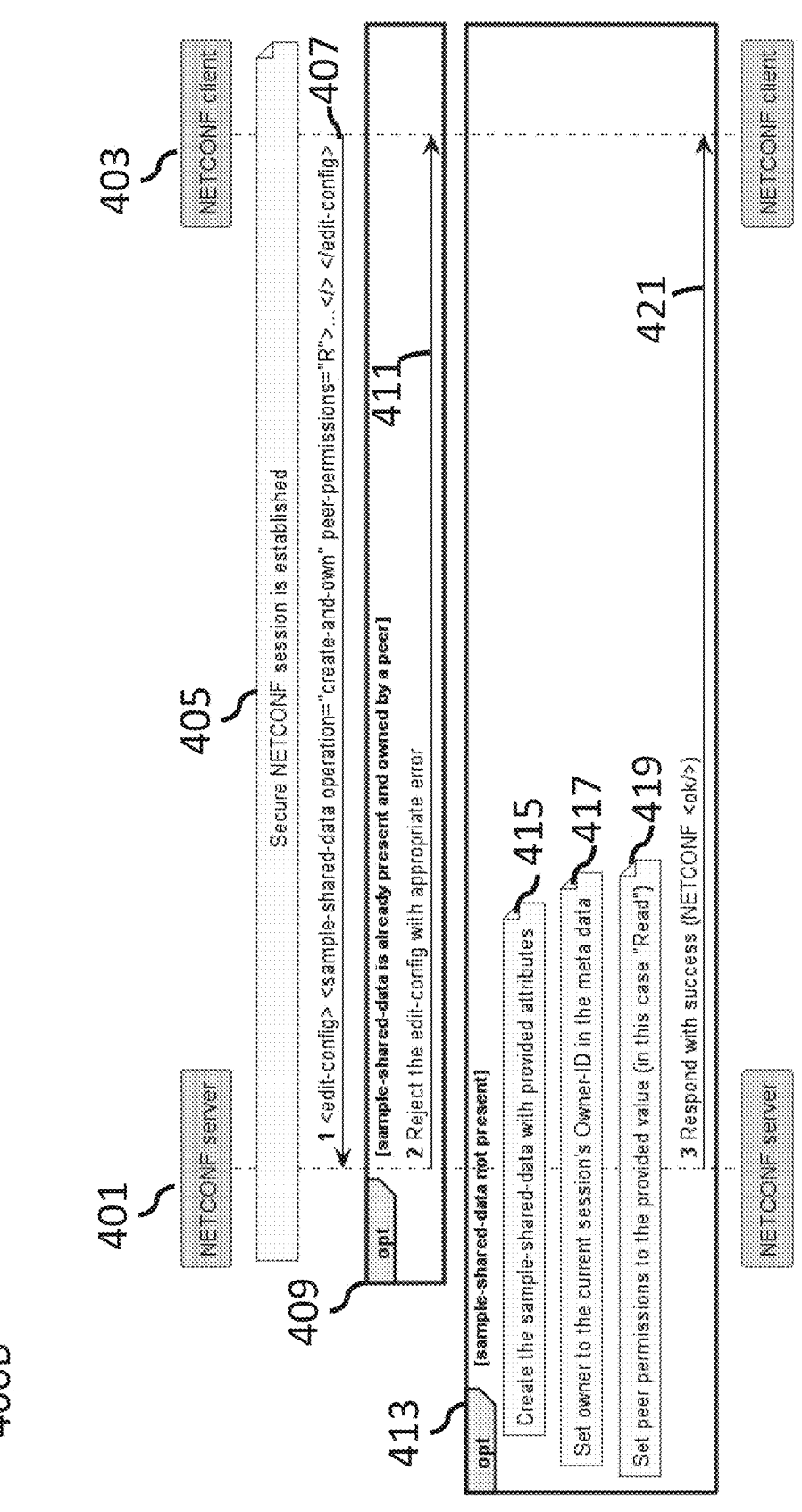
FIG. 4B is a sequence diagram of a method to create a shared data node instance using Create-and-Own operation, according to some embodiments of the subject disclosure.

FIG. 4B is a sequence diagram 400B showing a method to create a shared data node instance using Create-and-Own operation, according to at least some embodiments of the subject disclosure.

For a NETCONF server 401 and a NETCONF client 403 connected and/or in communication, a secure TLS/SSH session is established 405.

NETCONF client 403 delivers a command, request, and/or payload attempting to establish, create, and/or edit a configuration to NETCONF server 401. In some cases, NETCONF client 403 delivers a command, request, and/or payload attempting to establish, create, and/or edit a configuration to introduce or establish an operation. For example, a "create-and-own" operation configuration payload is delivered 407. A "peer-permissions" is specified in 407. In one example, a "read" permission is specified in configuration payload as "peer-permissions=R".

In response to receiving shared data, which is used to indicate a shared resource capability, a NETCONF server determines whether any shared data is already present 409, which is used to indicate that a configuration has already been carried out and or that peer ownership already exists and/or has been established.

In a case wherein shared data is already present at the NETCONF server and/or in a session or metadata, a command, request, and/or payload attempting to establish, create, and/or edit a configuration is rejected by, for example, returning an error code, message, and/or tag 411.

In a case wherein shared data is not already present at the NETCONF server and/or in a session or metadata, a command, request, and/or payload attempting to establish, create, and/or edit a configuration triggers entry or initiation of a branching logic or dependency control flow or sequence 413. In 413, shared data is created 415. For example, an owner-ID corresponding to an owner-ID as described in 300A or 300B is saved as a session variable and/or as metadata 417. Further, a peer permission level or the like is retrieved from the request and/or payload and similarly set 419. A configuration completion success message is delivered 421 from NETCONF server 401 to NETCONF client 403.

Update-and-Own

In some embodiments, an update-and-own privilege, permission, and/or operation is disclosed. An update-and-own operation indicates that data nodes and data node instances being updated should be associated with the owner-ID of the client performing the update-and-own operation, or requestor owner-ID. In some embodiments, permissions to perform this operation is allowed for clients with sudo privileges. In some embodiments, this operation gives exclusive access to a tenant to a set of data node instances and other tenants lose some or all privileges to the previously shared and/or common data node instance in a "shared" realm, as described herein. In some embodiments, SRO privileges and/or permissions to perform CRUDX operations on the data node instances are also specified along with this operation.

Figure 5A:
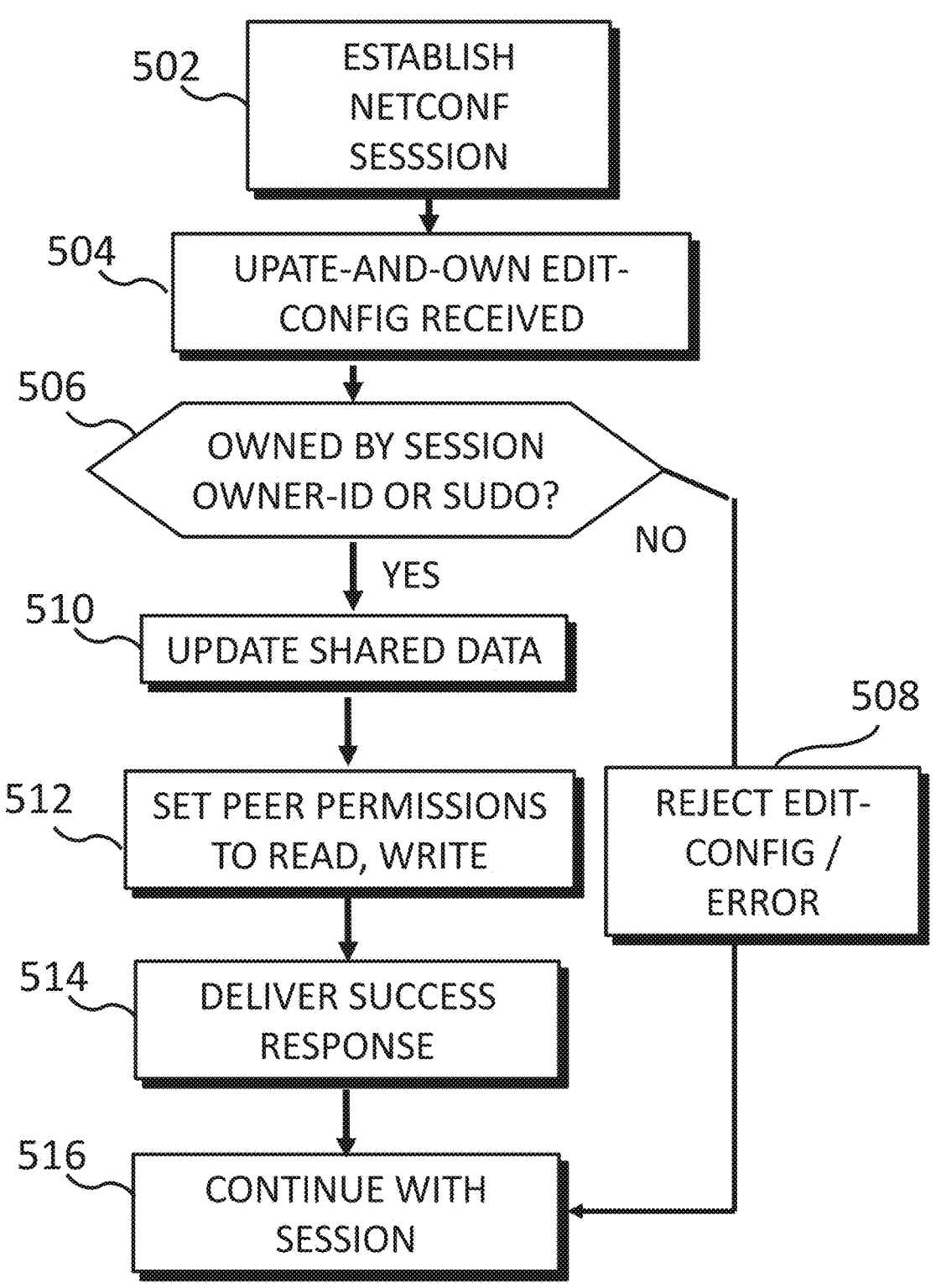
FIG. 5A is a flowchart of a method to update a shared data node instance using Update-and-Own operation, according to some embodiments of the subject disclosure.

FIG. 5A is a flowchart showing a method 500A to update a shared data node instance using Update-and-Own operation, according to at least some embodiments of the subject disclosure.

In operation 502, for a NETCONF server and a NETCONF client connected and/or in communication, a secure TLS/SSH session is established. In some embodiments, during an O-RU startup procedure, an M-Plane connection between an O-RU and NETCONF client is established, and an exchange of Transport Layer address information is carried out, including manual setting of Transport Layer addresses, allocation of Transport Layer addresses by a Dynamic Host Configuration Protocol (DHCP) server, and/or allocation of Transport Layer addresses by stateless address auto-configuration.

In operation 504, a NETCONF client delivers a command, request, and/or payload attempting to establish, create, and/or edit a configuration to a NETCONF server. In some cases, a NETCONF client delivers a command, request, and/or payload attempting to establish, create, and/or edit a configuration to introduce or establish an operation. For example, an "update-and-own" operation configuration payload is delivered 504. A "peer-permissions" is specified. In one example, a "read, write" permission is specified in configuration payload as "peer-permissions=RW".

In operation 506, in response to receiving an "update-and-own" operation configuration, a determination is made at a NETCONF server as to whether any current shared data exists in a session and/or metadata and, if so, whether that shared data indicates a current owner-ID matches any owner-ID persisted and/or present in a session state.

In a case wherein shared data indicates that a current owner-ID is present in a session variable and/or metadata, a comparison and/or match check operation is carried out. Comparison operation determines whether the current owner-ID in the session and/or metadata matches the owner-ID of the client performing the update-and-own operation, or requestor owner-ID.

In operation 508, In a case wherein a current owner-ID and a requestor owner-ID do not match, a command, request, and/or payload attempting to establish, create, and/or edit a configuration is rejected by, for example, returning an error code, message, and/or tag.

In operation 512, in a case wherein a current owner-ID and a requestor owner-ID match, entry into or initiation of a branching logic or dependency control flow or sequence is triggered. For example, an operation to update shared data attributes specified in a configuration request is carried out and/or committed. Further, a peer permission level or the like is retrieved from the configuration request and/or payload 504 and similarly set.

In operation 512, in a case wherein the requestor has sudo privileges, a comparison operation is skipped and entry into or initiation of a branching logic or dependency control flow or sequence is triggered. For example, an operation to update shared data attributes specified in a configuration request is carried out and/or committed. Further, a peer permission level or the like is retrieved from the configuration request and/or payload and similarly set.

In operation 514, after shared data is established and/or set, a success response is delivered and a control flow continues with a session 516.

Figure 5B:
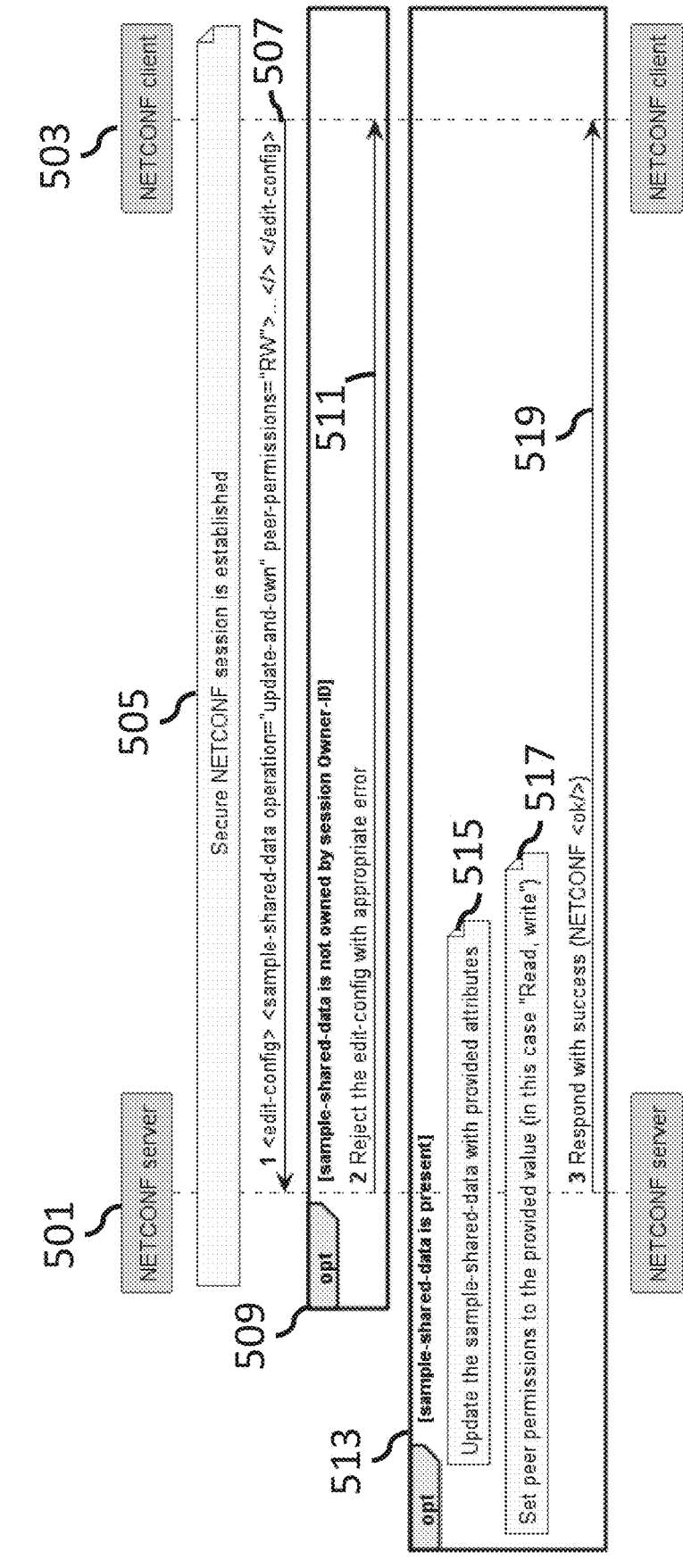
FIG. 5B is a sequence diagram of a method to update a shared data node instance using Update-and-Own operation, according to some embodiments of the subject disclosure.

FIG. 5B is a sequence diagram showing a method to update a shared data node instance using Update-and-Own operation, according to at least some embodiments of the subject disclosure.

In some embodiments, a NETCONF server 501 and a NETCONF client 503 are connected and/or in communication. A secure TLS/SSH session is established 505.

NETCONF client 503 delivers a command, request, and/or payload attempting to establish, create, and/or edit a configuration to a NETCONF server. In some cases, a NETCONF client delivers a command, request, and/or payload attempting to establish, create, and/or edit a configuration to introduce or establish an operation. For example, an "update-and-own" operation configuration payload is delivered 507. A "peer-permissions" is specified. In one example, a "read, write" permission is specified in configuration payload as "peer-permissions=RW" in 507.

In response to receiving an "update-and-own" operation configuration, a determination 509 is made at a NETCONF server as to whether any current shared data exists in a session and/or metadata and, if so, whether that shared data indicates a current owner-ID matches any owner-ID persisted and/or present in a session state.

In a case wherein shared data indicates that a current owner-ID is present in a session variable and/or metadata, a comparison and/or match check operation is carried out. Comparison operation determines whether the current owner-ID in the session and/or metadata matches the owner-ID of the client performing the update-and-own operation, or requestor owner-ID.

In a case wherein a current owner-ID and a requestor owner-ID do not match and/or a requestor or session does not have sudo privileges, a command, request, and/or payload attempting to establish, create, and/or edit a configuration 507 is rejected by, for example, returning an error code, message, and/or tag 511.

In a case wherein a current owner-ID and a requestor owner-ID match, entry into or initiation of a branching logic or dependency control flow 513 or sequence is triggered. For example, an operation to update shared data attributes specified in a configuration request is carried out and/or committed 515. Further, a peer permission level or the like is retrieved from the configuration request and/or payload 507 and similarly set 517.

In a case wherein the requestor has sudo privileges, a comparison operation is skipped and entry into or initiation of a branching logic or dependency control flow 513 or sequence is triggered. For example, an operation to update shared data attributes specified in a configuration request is carried out and/or committed. Further, a peer permission level or the like is retrieved from the configuration request and/or payload 507 and similarly set 517.

After shared data is established and/or set, a control flow continues with a session as usual.

Change-Ownership

In some embodiments, a change-ownership privilege, permission, and/or operation is disclosed. A change-ownership operation indicates that the ownership of data nodes and data node instances is capable of being changed to other owner-IDs. In some embodiments, permissions to perform this operation is allowed for current owner clients and/or clients with sudo privileges. In some embodiments, this operation gives exclusive access to a tenant to a set of data node instances and other tenants lose some or all privileges to the previously shared and/or common data node instance. In some embodiments, peer permissions to perform CRUDX operations on the data node instances are also specified along with this operation.

Figure 6A:
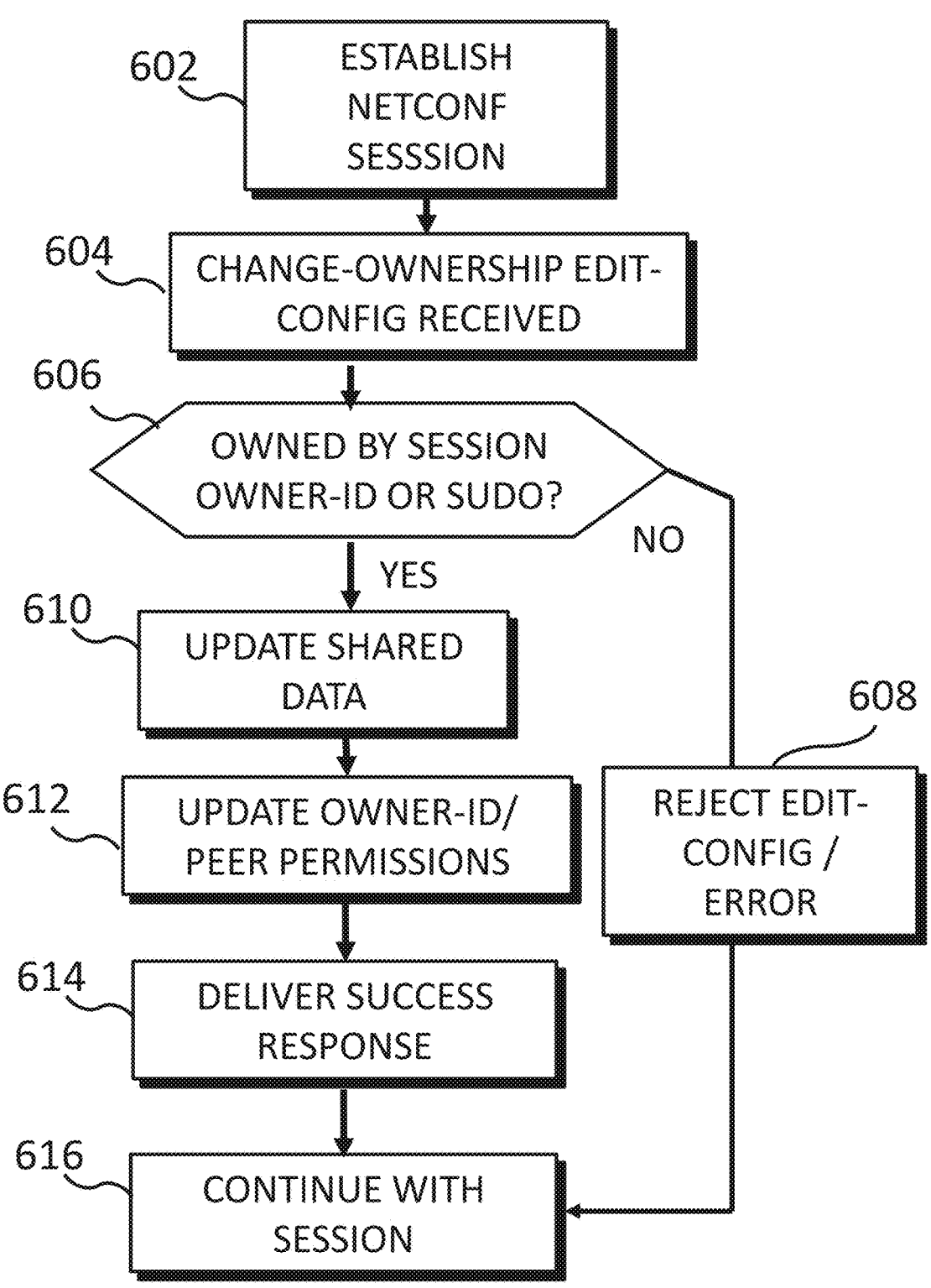
FIG. 6A is a flowchart of a method to update the owner-ship of a shared data node instance using change-ownership operation, according to some embodiments of the subject disclosure.

FIG. 6A is a flowchart showing a method 600A to update the ownership of a shared data node instance using change-ownership operation, according to at least some embodiments of the subject disclosure.

In operation 602, for a NETCONF server and a NETCONF client connected and/or in communication, a secure TLS/SSH session is established. In some embodiments, during an O-RU startup procedure, an M-Plane connection between an O-RU and NETCONF client is established, and an exchange of Transport Layer address information is carried out, including manual setting of Transport Layer addresses, allocation of Transport Layer addresses by a Dynamic Host Configuration Protocol (DHCP) server, and/or allocation of Transport Layer addresses by stateless address auto-configuration.

In operation 604, a NETCONF client delivers a command, request, and/or payload attempting to establish, create, and/or edit a configuration to a NETCONF server. In some cases, a NETCONF client delivers a command, request, and/or payload attempting to establish, create, and/or edit a configuration to introduce or establish an operation. For example, a "change-ownership" operation configuration payload delivered.

In operation 606, in response to receiving a "change-ownership" operation configuration, a determination is made at a NETCONF server as to whether any current shared data exists in a session and/or metadata and, if so, whether that shared data indicates a current owner-ID matches any owner-ID persisted and/or present in a session state.

In a case wherein shared data indicates that a current owner-ID is present in a session variable and/or metadata, a comparison and/or match check operation is carried out. Comparison operation determines whether the current owner-ID in the session and/or metadata matches the owner-ID of the client performing the update-and-own operation, or requestor owner-ID.

In operation 608, in a case wherein a current owner-ID and a requestor owner-ID do not match and/or a requestor or session does not have sudo privileges, a command, request, and/or payload attempting to establish, create, and/or edit a configuration is rejected by, for example, returning an error code, message, and/or tag.

In a case wherein a current owner-ID and a requestor owner-ID match, entry into or initiation of a branching logic or dependency control flow or sequence is triggered. For example, an operation to update shared data attributes specified in a configuration request is carried out and/or committed and/or an owner-ID is updated in a session, session variable, and/or metadata.

In operation 612, an a case wherein the requestor has sudo privileges, a comparison operation is skipped and entry into or initiation of a branching logic or dependency control flow or sequence is triggered. For example, an operation 610 to update shared data attributes specified in a configuration request is carried out and/or committed and/or an owner-ID is updated in a session, session variable, and/or metadata.

After shared data is established and/or set, a success response is delivered 614 and a control flow continues with a session as usual 616.

Figure 6B:
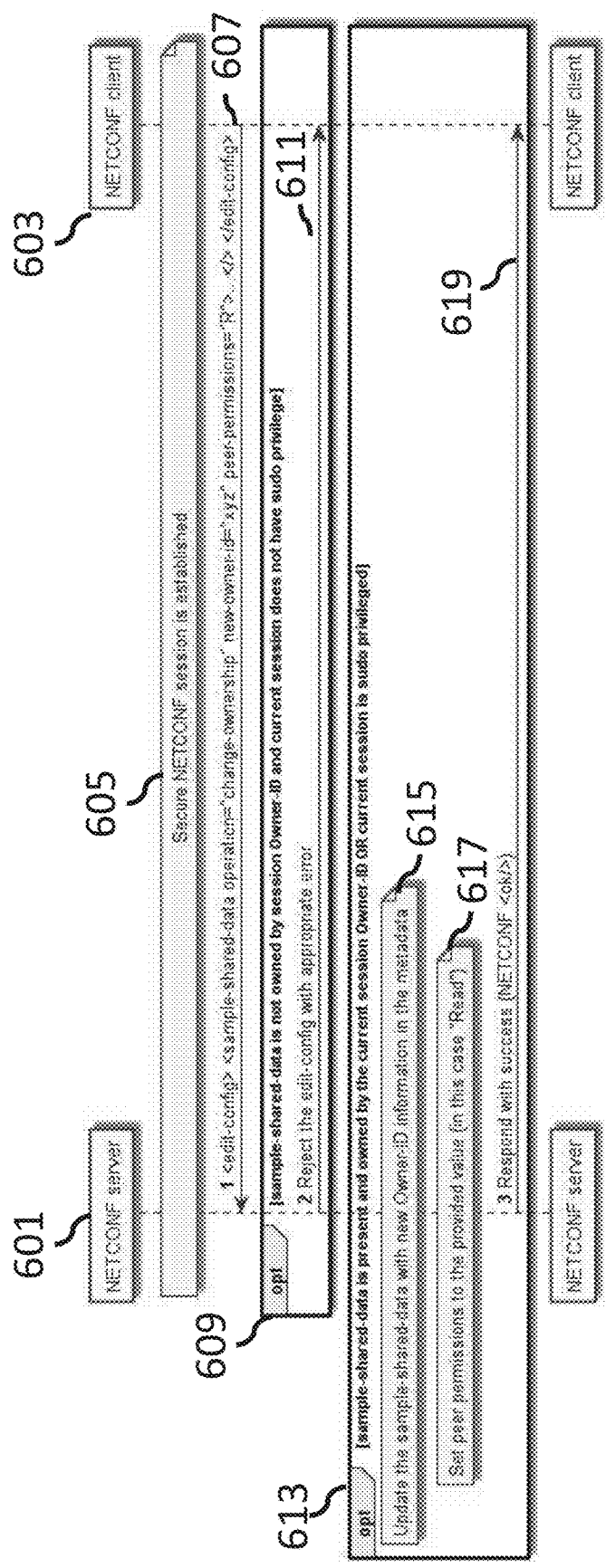
FIG. 6B is a sequence diagram of a method to update the ownership of a shared data node instance using change-ownership operation, according to some embodiments of the subject disclosure.

FIG. 6B is a sequence diagram showing a method to update the ownership of a shared data node instance using change-ownership operation, according to at least some embodiments of the subject disclosure.

For a NETCONF server 601 and a NETCONF client 603 is connected and/or in communication, a secure TLS/SSH session is established 605.

NETCONF client 603 delivers a command, request, and/or payload attempting to establish, create, and/or edit a configuration to a NETCONF server 601. In some cases, NETCONF client 603 delivers a command, request, and/or payload attempting to establish, create, and/or edit a configuration to introduce or establish an operation. For example, an "change-ownership" operation configuration payload is delivered 607, wherein a "new-owner-id" is set along with "peer-permissions" set to "R" (read).

In response to receiving a "change-ownership" operation configuration, a determination 609 is made at a NETCONF server 601 as to whether any current shared data exists in a session and/or metadata and, if so, whether that shared data indicates a current owner-ID matches any owner-ID persisted and/or present in a session state.

In a case wherein shared data indicates that a current owner-ID is present in a session variable and/or metadata, a comparison and/or match check operation is carried out. Comparison operation determines whether the current owner-ID in the session and/or metadata matches the owner-ID of the client performing the update-and-own operation, or requestor owner-ID.

In a case wherein a current owner-ID and a requestor owner-ID do not match and/or a requestor or session does not have sudo privileges, a command, request, and/or payload attempting to establish, create, and/or edit a configuration is rejected by, for example, returning an error code, message, and/or tag 611.

In a case wherein a current owner-ID and a requestor owner-ID match, entry into or initiation of a branching logic or dependency control flow or sequence 613 is triggered. For example, an operation to update shared data attributes specified in a configuration request is carried out and/or committed and/or an owner-ID and/or peer-permissions are updated in a session, session variable, and/or metadata.

In a case wherein the requestor has sudo privileges, a comparison operation is skipped and entry into or initiation of a branching logic or dependency control flow or sequence is triggered. For example, an operation to update shared data attributes specified in a configuration request is carried out and/or committed and/or an owner-ID are updated in a session, session variable, and/or metadata 615. Further, for example, an operation to update shared data attributes specified in a configuration request is carried out and/or committed and/or peer-permissions are updated in a session, session variable, and/or metadata 617.

After shared data is established and/or set, a success response is delivered 619 and a control flow continues with a session as usual.

Relinquish-Ownership

In some embodiments, a relinquish-ownership privilege, permission, and/or operation is disclosed. A relinquish-ownership operation indicates that the ownership of data nodes and data node instances is being relinquished/given away and, in some embodiments, there will be no owner of the data node instances after successful completion of this operation. In some embodiments, permissions to perform this operation is allowed for current owner clients and/or clients with sudo privileges. In some embodiments, this operation gives exclusive access to a tenant to a set of data node instances and other tenants lose some or all privileges to the previously shared and/or common data node instance. In some embodiments, SRO privileges and/or permissions to perform CRUDX operations on the data node instances are also specified along with this operation.

In some embodiments, a list of owner IDs and/or SRO-IDs which have ownership on different data sub-trees of a datastore are retrieved by a NETCONF client having sudo privileges. In some embodiments, owner IDs and/or SRO-ID are classified as sensitive data and the NETCONF server protects the ID metadata at rest by encrypting the data.

The YANG modelling syntax does not provide a mechanism to declare a data type as shared. A "realm" attribute is disclosed herein for the YANG model to indicate data nodes that have shared realm. A NETCONF server allow the operations that are defined herein (including Create-and-Own, Update-and-Own, Change-Ownership and Relinquish-Ownership) on the data nodes with realm attribute defined as "shared".

Figure 7A:
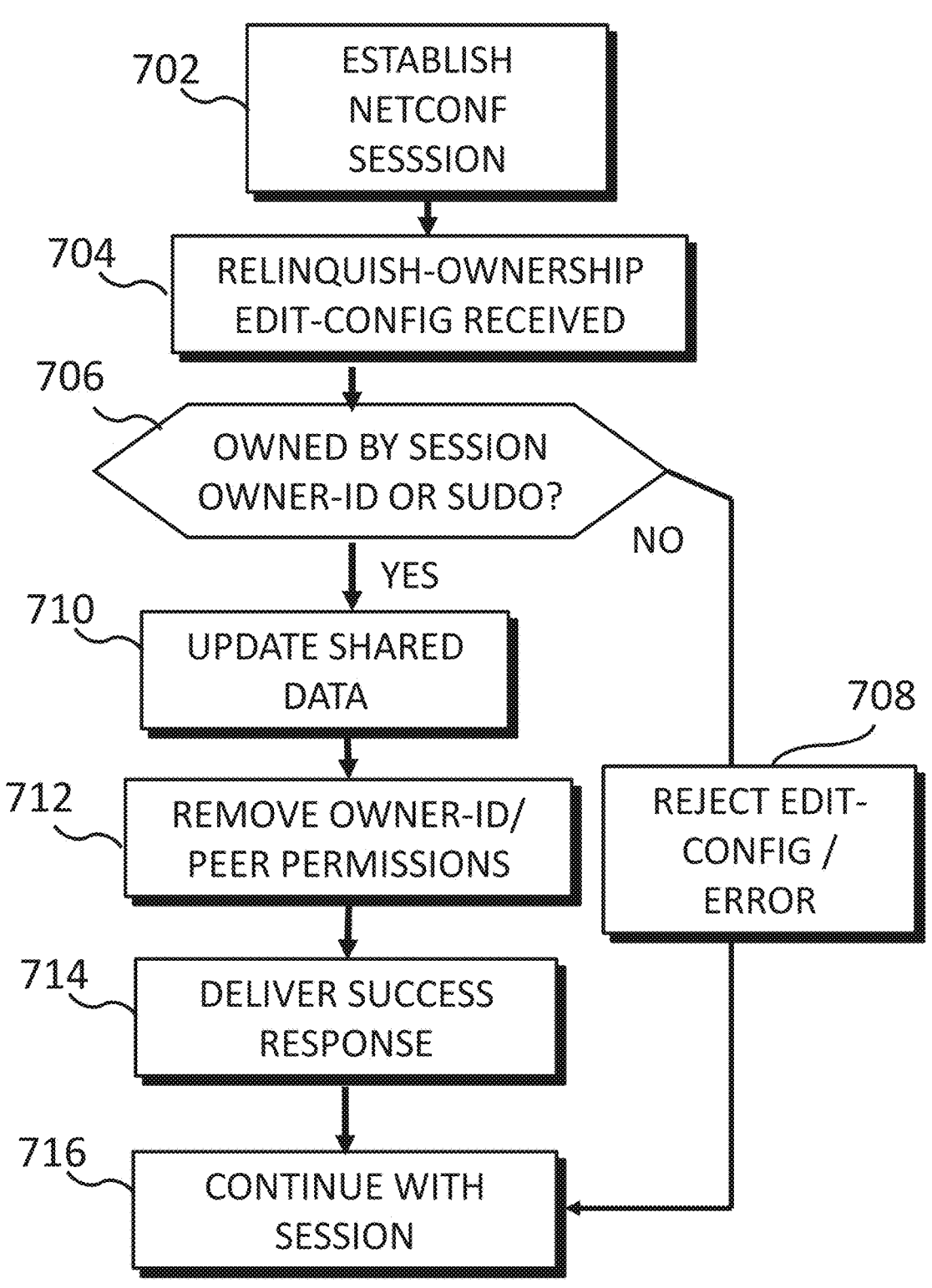
FIG. 7A is a flowchart of a method to relinquish the ownership of a shared data node instance using relinquish-ownership operation, according to some embodiments of the subject disclosure.

FIG. 7A is a flowchart showing a method 700A to relinquish the ownership of a shared data node instance using relinquish-ownership operation, according to at least some embodiments of the subject disclosure.

In operation 702, for a NETCONF server and a NETCONF client are connected and/or in communication, a secure TLS/SSH session is established. In some embodiments, during an O-RU startup procedure, an M-Plane connection between an O-RU and NETCONF client is established, and an exchange of Transport Layer address information is carried out, including manual setting of Transport Layer addresses, allocation of Transport Layer addresses by a Dynamic Host Configuration Protocol (DHCP) server, and/or allocation of Transport Layer addresses by stateless address auto-configuration.

In operation 704, a NETCONF client delivers a command, request, and/or payload attempting to establish, create, and/or edit a configuration to a NETCONF server. In some cases, a NETCONF client delivers a command, request, and/or payload attempting to establish, create, and/or edit a configuration to introduce or establish an operation. For example, a "relinquish-ownership" operation configuration payload is delivered.

In operation 706, in response to receiving a "relinquish-ownership" operation configuration, a determination is made at a NETCONF server, as to whether any current shared data exists in a session and/or metadata and, if so, whether that shared data indicates a current owner-ID matches any owner-ID persisted and/or present in a session state.

In a case wherein shared data indicates that a current owner-ID is present in a session variable and/or metadata, a comparison and/or match check operation is carried out. Comparison operation determines whether the current owner-ID in the session and/or metadata matches the owner-ID of the client performing the update-and-own operation, or requestor owner-ID.

In operation 708, in a case wherein a current owner-ID and a requestor owner-ID do not match and/or a requestor or session does not have sudo privileges, a command, request, and/or payload attempting to establish, create, and/or edit a configuration is rejected by, for example, returning an error code, message, and/or tag.

In a case wherein a current owner-ID and a requestor owner-ID match, entry into or initiation of a branching logic or dependency control flow or sequence is triggered. For example, an operation to update shared data attributes specified in a configuration request is carried out and/or committed and/or an owner-ID is updated in a session, session variable, and/or metadata.

In operation 712, in a case wherein the requestor has sudo privileges, a comparison operation is skipped and entry into or initiation of a branching logic or dependency control flow or sequence is triggered. For example, an operation 710 to update shared data attributes specified in a configuration request is carried out and/or committed and/or an owner-ID is updated and/or removed in a session, session variable, and/or metadata.

In operation 714, after shared data is established and/or set, a success response is delivered and a control flow continues with a session 716.

Figure 7B:
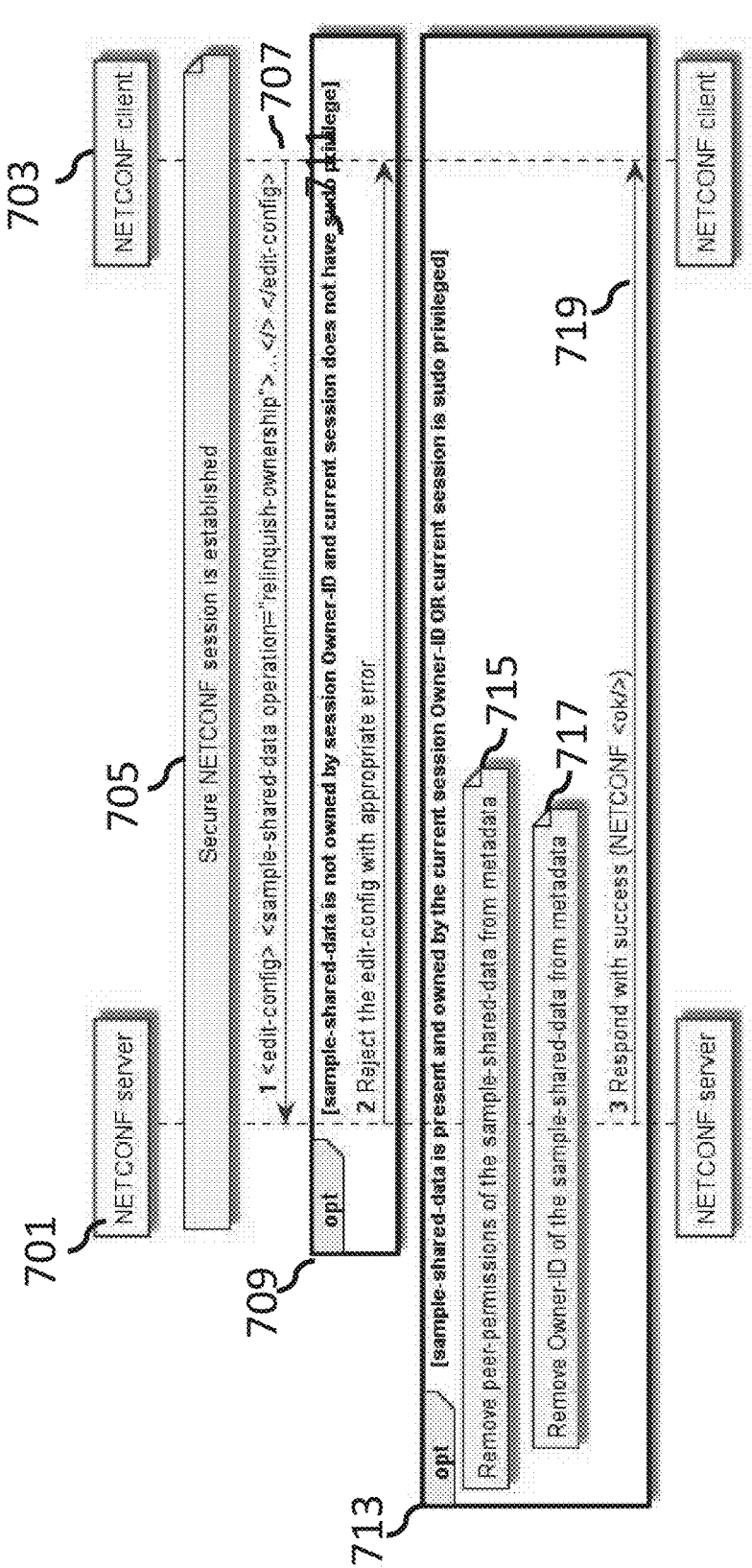
FIG. 7B is a sequence diagram of a method to relinquish the ownership of a shared data node instance using relin-quish-ownership operation, according to some embodiments of the subject disclosure.

FIG. 7B is a sequence diagram showing a method to relinquish the ownership of a shared data node instance using relinquish-ownership operation, according to at least some embodiments of the subject disclosure.

In some embodiments, a NETCONF server 701 and a NETCONF client 703 are connected and/or in communication. A secure TLS/SSH session is established 705.

NETCONF client 703 delivers a command, request, and/or payload attempting to establish, create, and/or edit a configuration to a NETCONF server 701. In some cases, NETCONF client 703 delivers a command, request, and/or payload attempting to establish, create, and/or edit a configuration to introduce or establish an operation. For example, a "relinquish-ownership" operation configuration payload is delivered 707.

In response to receiving a "relinquish-ownership" operation configuration, a determination 709 is made at a NETCONF server 701 as to whether any current shared data exists in a session and/or metadata and, if so, whether that shared data indicates a current owner-ID matches any owner-ID persisted and/or present in a session state.

In a case wherein shared data indicates that a current owner-ID is present in a session variable and/or metadata, a comparison and/or match check operation is carried out. Comparison operation determines whether the current owner-ID in the session and/or metadata matches the owner-ID of the client performing the relinquish-operation, or requestor owner-ID.

In a case wherein a current owner-ID and a requestor owner-ID do not match and/or a requestor or session does not have sudo privileges, a command, request, and/or payload attempting to establish, create, and/or edit a configuration is rejected by, for example, returning an error code, message, and/or tag 711.

In a case wherein a current owner-ID and a requestor owner-ID match, entry into or initiation of a branching logic or dependency control flow or sequence 713 is triggered. For example, an operation to update shared data attributes specified in a configuration request is carried out and/or committed and/or an owner-ID is updated in a session, session variable, and/or metadata.

In a case wherein the requestor has sudo privileges, a comparison operation is skipped and entry into or initiation of a branching logic or dependency control flow or sequence is triggered. For example, an operation to update shared data attributes specified in a configuration request is carried out and/or committed and/or an owner-ID is updated and/or removed in a session, session variable, and/or metadata 715. Similarly, peer-permissions are updated and/or removed 717.

After shared data is established and/or set, a success response is delivered 719 and a control flow continues with a session as usual.

Figure 8:
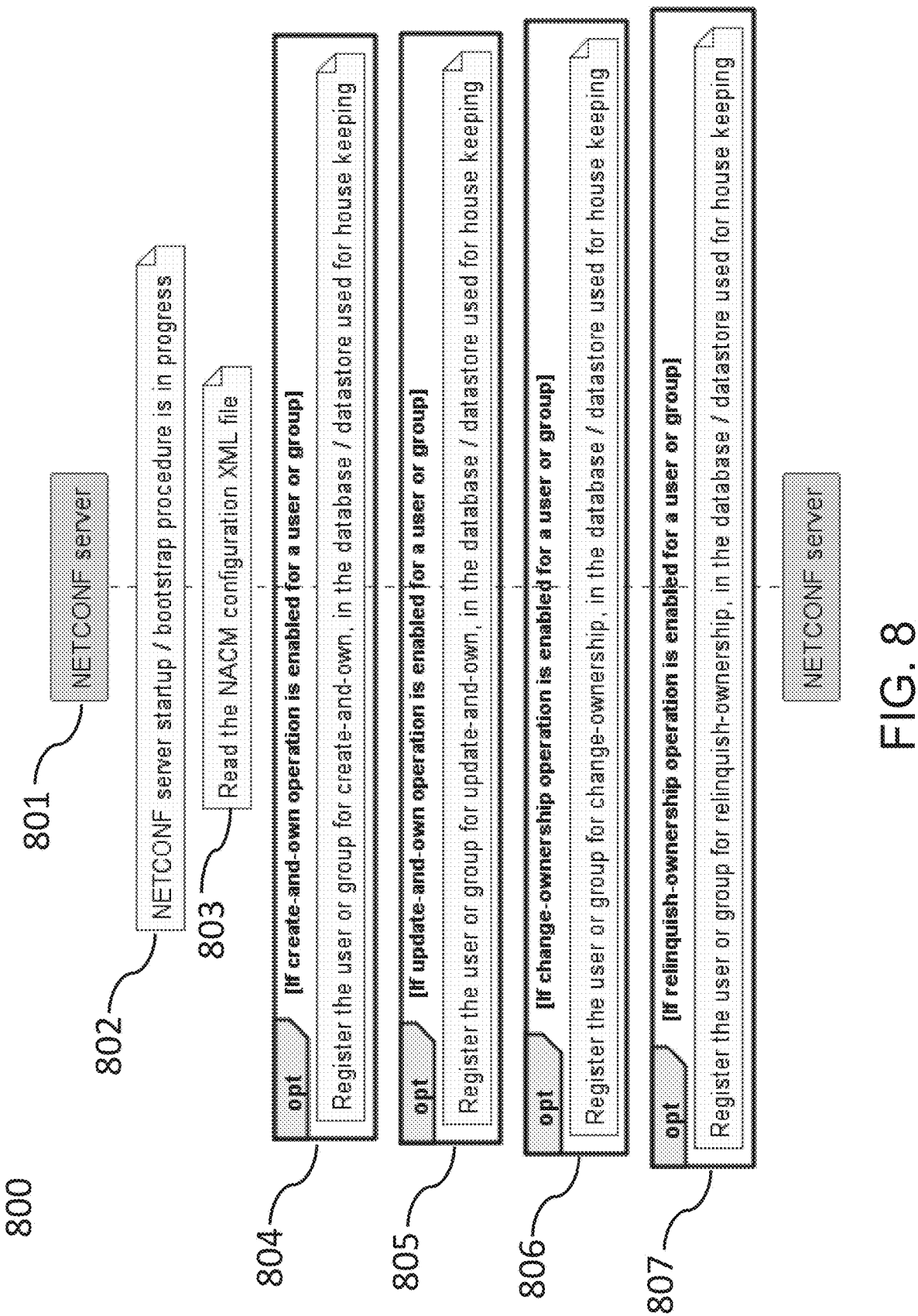
FIG. 8 is a sequence diagram of a method of a NETCONF server startup/bootstrap procedure, according to at embodi-ments of the subject disclosure.

FIG. 8 is a sequence diagram showing a method 800 of a NETCONF server startup/bootstrap procedure, according to at least some embodiments of the subject disclosure.

NETCONF server 801 enters into a startup and/or boot-strapping 802 procedure, sequence, and/or flow. An NACM configuration XML file is read 803.

If a "create-and-own" operation is enabled for a user or group, the respective user or group is registered 804 for the operation in a database/datastore.

If a "update-and-own" operation is enabled for a user or group, the respective user or group is registered 805 for the operation in a database/datastore.

If a "change-ownership" operation is enabled for a user or group, the respective user or group is registered 806 for the operation in a database/datastore.

If a "relinquish-ownership" operation is enabled for a user or group, the respective user or group is registered 807 for the operation in a database/datastore.

An example of configuration XML that is included in an NACM configuration file is shown below:

```xml
<?xml version="1.0" encoding="UTF-8"?>
<config>
  <aaa>
    <authentication>
      <users>
        <user>
          <name>tenant1</name>
          <uid>9010</uid>
          <gid>110</gid>
          <password>$4$S8IcVMOz$S8yMepHMMJob0VUIp</password>
          <ssh_keydir>/home/tenant1/.ssh</ssh_keydir>
          <homedir>/home/tenant1</homedir>
        </user>
        <user>
          <name>tenant2</name>
          <uid>9020</uid>
          <gid>120</gid>
          <password>$4$1PLj4WOr$qPPiuZ5gCL/Zv+Gw</password>
          <ssh_keydir>/home/tenant2/.ssh</ssh_keydir>
          <homedir>/home/tenant2</homedir>
        </user>
        <user>
          <name>tenant3</name>
          <uid>9030</uid>
          <gid>130</gid>
          <password>$4$WzRAA7g8$SmW4CEDE/BUA7Xyox3x</password>
          <ssh_keydir>/home/tenant3/.ssh</ssh_keydir>
          <homedir>/home/tenant3</homedir>
        </user>
      </users>
    </authentication>
  </aaa>
  <nacm xmlns="urn:ietf:params:xml:ns:yang:ietf-netconf-acm">
    <write-default>permit</write-default>
    <groups>
      <group>
        <name>readOnlyTenantGroup</name>
        <user-name>tenant1</user-name>
        <user-name>tenant2</user-name>
      </group>
      <group>
        <name>readWriteTenantGroup</name>
        <user-name>tenant3</user-name>
      </group>
    </groups>
    <rule-list>
      <name>readOnlyTenants</name>
      <group>readOnlyTenantGroup</group>
      <rule>
        <name>sharedResource-rule1</name>
        <path>/root/shared-resource</path>
        <access-operations>create update delete create-and-own update-and-own
change-ownership relinquish-ownership </access-operations>
        <action>deny</action>
      </rule>
      <rule>
        <name>sharedResource-rule2</name>
        <path>/root/shared-resource</path>
        <access-operations>read</access-operations>
        <action>allow</action>
      </rule>
    </rule-list>
    <rule-list>
      <name>readWriteTenants</name>
      <group>readWriteTenantGroup</group>
      <rule>
        <name>sharedResource</name>
        <path>/root/shared-resource</path>
        <access-operations>create-and-own   update-and-own   relinquish-
```

-continued

```
ownership</access-operations>
        <action>allow</action>
      </rule>
    </rule-list>
  </nacm>
</config>
```

Figure 9:
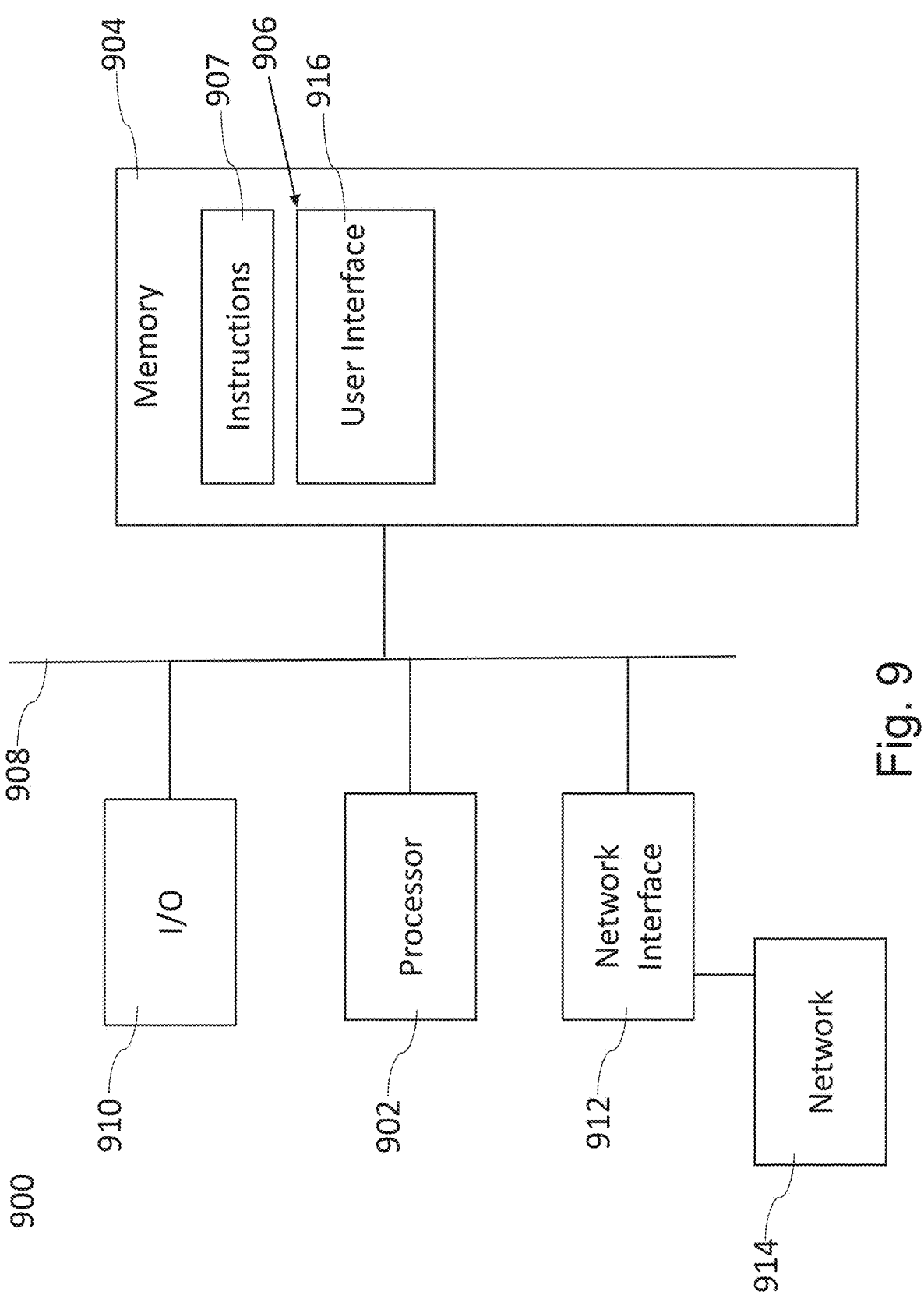
FIG. 9 is a block diagram of a computer architecture in accordance with some embodiments.

FIG. 9 is a block diagram of computer architecture 900 in accordance with some embodiments.

Computer architecture 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with external devices. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause computer architecture 900 to be usable for performing a portion or all of the operations as described herein.

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause computer architecture 900 to perform a portion or all of the operations as described herein. In some embodiments, the storage medium 904 also stores information needed for performing a portion or all of the operations as described herein as well as information generated during performing a portion or all of the operations as described herein, such as a user interface parameter 916.

In some embodiments, the storage medium 904 stores instructions 907 for interfacing with external devices. The instructions 907 enable processor 902 to generate instructions readable by the external devices to effectively implement a portion or all of the operations as described herein.

Computer architecture 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

Computer architecture 900 also includes network interface 912 coupled to the processor 902. Network interface 912 allows computer architecture 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described herein, and information are exchanged between different computer architecture 900 via network 914.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above-described embodiments. Persons skilled in the art would understand that various alterations and improvements to the above-described embodiments are possible. Persons skilled in the art would also understand from the scope of the claims that the embodiments added with such alterations or improvements are included in the technical scope of the disclosure.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

Illustrative examples of the disclosure include:

Aspect 1: A system comprising:

a first set of non-transitory computer readable media comprising one or more non-transitory computer readable media configured to store instructions thereon; and a first set of processors comprising one or more processors connected to the first set of non-transitory computer readable media, wherein the first set of processors is configured to execute the instructions for:

generating or obtaining, by a NETCONF client, a first identifier;

wherein the first identifier uniquely identifies the NETCONF client;

establishing a first NETCONF session between a NETCONF server and the NETCONF client;

wherein the NETCONF server comprises a first O-RU;

wherein the NETCONF client comprises a first O-DU;

delivering, from the NETCONF client to the NETCONF server, a first request during a NETCONF session handshake comprising the first identifier;

delivering, from the NETCONF client to the NETCONF server, a first edit configuration request or payload;

wherein the first edit configuration request or payload comprises the first identifier.

Aspect 2: The system of Aspect 1, wherein the first edit configuration request or payload further comprises a first operation to:

create one or more data nodes or data node instances; and associate the one or more data nodes or data instances with the first identifier.

Aspect 3: The system of any of Aspects 1 to 2, wherein the first edit configuration request or payload further comprises a first operation to:

update one or more data nodes or data node instances; and associate the one or more data nodes or data instances with the first identifier.

Aspect 4: The system of any of Aspects 1 to 3, wherein first identifier is not stored in the one or more data nodes or data node instances.

Aspect 5: The system of any of Aspects 1 to 4, wherein the first set of processors is further configured to execute the instructions for:

rejecting the first edit configuration request or payload in response to determining that the one or more data nodes or data instances is associated with a second identifier different from the first identifier.

Aspect 6: The system of any of Aspects 1 to 5, wherein the first set of processors is further configured to execute the instructions for:

associating, with the first NETCONF session, the first identifier as metadata.

Aspect 7: The system of any of Aspects 1 to 6, wherein the first set of processors is further configured to execute the instructions for:

setting one or more peer permissions.

Aspect 8. A method comprising:

generating or obtaining, by a NETCONF client, a first identifier;

wherein the first identifier uniquely identifies the NET-CONF client;

establishing a first NETCONF session between a NET-CONF server and the NETCONF client;

wherein the NETCONF server comprises a first O-RU;

wherein the NETCONF client comprises a first O-DU;

delivering, from the NETCONF client to the NETCONF server, a first request during a NETCONF session handshake comprising the first identifier;

delivering, from the NETCONF client to the NETCONF server, a first edit configuration request or payload;

wherein the first edit configuration request or payload comprises the first identifier.

Aspect 9: The method of Aspect 8, wherein the first edit configuration request or payload further comprises a first operation to:

create one or more data nodes or data node instances; and associate the one or more data nodes or data instances with the first identifier.

Aspect 10: The method of any of Aspects 8 to 9, wherein the first edit configuration request or payload further comprises a first operation to:

update one or more data nodes or data node instances; and associate the one or more data nodes or data instances with the first identifier.

Aspect 11: The method of any of Aspects 8 to 10, wherein first identifier is not stored in the one or more data nodes or data node instances.

Aspect 12: The method of any of Aspects 8 to 11, further comprising:

rejecting the first edit configuration request or payload in response to determining that the one or more data nodes or data instances is associated with a second identifier different from the first identifier.

Aspect 13: The method of any of Aspects 8 to 12, further comprising:

associating, with the first NETCONF session, the first identifier as metadata.

Aspect 14: The method of any of Aspects 8 to 13, further comprising:

setting one or more peer permissions.

Aspect 15: A non-transitory computer readable medium configured to store instructions that when executed cause one or more processors to execute the instructions, the instructions comprising:

generating or obtaining, by a NETCONF client, a first identifier;

wherein the first identifier uniquely identifies the NET-CONF client;

establishing a first NETCONF session between a NET-CONF server and the NETCONF client;

wherein the NETCONF server comprises a first O-RU;

wherein the NETCONF client comprises a first O-DU;

delivering, from the NETCONF client to the NETCONF server, a first request during a NETCONF session handshake comprising the first identifier;

delivering, from the NETCONF client to the NETCONF server, a first edit configuration request or payload;

wherein the first edit configuration request or payload comprises the first identifier.

Aspect 16: The non-transitory computer readable medium of Aspect 15, wherein the first edit configuration request or payload further comprises a first operation to:

create one or more data nodes or data node instances; and associate the one or more data nodes or data instances with the first identifier.

Aspect 17: The non-transitory computer readable medium of any of Aspects 15 to 16, wherein the first edit configuration request or payload further comprises a first operation to:

update one or more data nodes or data node instances; and associate the one or more data nodes or data instances with the first identifier.

Aspect 18: The non-transitory computer readable medium of any of Aspects 15 to 17, wherein first identifier is not stored in the one or more data nodes or data node instances.

Aspect 19: The non-transitory computer readable medium of any of Aspects 15 to 18, the instructions further comprising:

rejecting the first edit configuration request or payload in response to determining that the one or more data nodes or data instances is associated with a second identifier different from the first identifier.

Aspect 20: The non-transitory computer readable medium of any of Aspects 15 to 19, the instructions further comprising:

associating, with the first NETCONF session, the first identifier as metadata.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

generating or obtaining a first identifier, wherein the first identifier uniquely identifies a network configuration protocol (NETCONF) client;

establishing a first NETCONF session between a NET-CONF server and the NETCONF client;

transmitting a first request to the NETCONF server, during a NETCONF session handshake, wherein the first request comprises the first identifier; and transmitting a first edit configuration communication to the NETCONF server, wherein the first edit configuration communication comprises the first identifier.

2. The method of claim 1, further comprising:

creating one or more data nodes or data node instances in response to receiving the first edit configuration communication; and associating the one or more data nodes or data instances with the first identifier in response to receiving the first edit configuration communication.

3. The method of claim 2, wherein first identifier is stored outside of the one or more data nodes or data node instances.

4. The method of claim 2, further comprising:

associating, with the first NETCONF session, the first identifier as metadata.

5. The method of claim 1, further comprising:

updating one or more data nodes or data node instances in response to receiving the first edit configuration communication; and associating the one or more data nodes or data instances with the first identifier in response to receiving the first edit configuration communication.

6. The method of claim 1, further comprising:

rejecting the first edit configuration communication in response to determining that the one or more data nodes or data instances is associated with a second identifier different from the first identifier.

7. The method of claim 1, further comprising:

setting one or more peer permissions to access the first edit configuration communication.

8. A system comprising:

a non-transitory computer readable medium storing instructions thereon; and a processor connected to the non-transitory computer readable medium, wherein the instructions, when executed by the processor, cause the system to:

generate or obtain a first identifier, wherein the first identifier uniquely identifies a network configuration protocol (NETCONF) client;

establish a first NETCONF session between a NETCONF server and the NETCONF client;

transmit, by a transmitter, a first request to the NETCONF server, during a NETCONF session handshake, wherein the first request comprises the first identifier; and transmit, by the transmitter, a first edit configuration communication to the NETCONF server, wherein the first edit configuration communication comprises the first identifier.

9. The system of claim 8, wherein the system is configured to:

create one or more data nodes or data node instances in response to receiving the first edit configuration communication; and associate the one or more data nodes or data instances with the first identifier in response to receiving the first edit configuration communication.

10. The system of claim 9, wherein first identifier is stored outside of the one or more data nodes or data node instances.

11. The system of claim 9, wherein the instructions, when executed by the processor, further cause the system to:

associate, with the first NETCONF session, the first identifier as metadata.

12. The system of claim 8, wherein the system is configured to:

update one or more data nodes or data node instances in response to receiving the first edit configuration communication; and associate the one or more data nodes or data instances with the first identifier in response to receiving the first edit configuration communication.

13. The system of claim 8, wherein the instructions, when executed by the processor, further cause the system to:

reject the first edit configuration communication in response to a determination that the one or more data nodes or data instances is associated with a second identifier different from the first identifier.

14. The system of claim 8, wherein the instructions, when executed by the processor, further cause the system to:

set one or more peer permissions to access the first edit configuration communication.

15. A non-transitory computer readable medium storing instructions that when executed cause one or more processors cause a system to:

generate or obtaining a first identifier, wherein the first identifier uniquely identifies a network configuration protocol (NETCONF) client;

establish a first NETCONF session between a NETCONF server and the NETCONF client;

transmit, by a transmitter, a first request to the NETCONF server, during a NETCONF session handshake, wherein the first request comprises the first identifier; and transmit, by the transmitter, a first edit configuration communication to the NETCONF server, wherein the first edit configuration communication comprises the first identifier.

16. The non-transitory computer readable medium of claim 15, wherein the instructions when executed by the one or more processors cause the system to:

create one or more data nodes or data node instances in response to receiving the first edit configuration communication; and associate the one or more data nodes or data instances with the first identifier in response to receiving the first edit configuration communication.

17. The non-transitory computer readable medium of claim 16, wherein first identifier is stored outside of the one or more data nodes or data node instances.

18. The non-transitory computer readable medium of claim 16, the instructions when executed by the one or more processors cause the system to:

associate, with the first NETCONF session, the first identifier as metadata.

19. The non-transitory computer readable medium of claim 15, wherein the instructions when executed by the one or more processors cause the system to:

update one or more data nodes or data node instances in response to receiving the first edit configuration communication; and associate the one or more data nodes or data instances with the first identifier in response to receiving the first edit configuration communication.

20. The non-transitory computer readable medium of claim 15, the instructions when executed by the one or more processors cause the system to:

reject the first edit configuration communication in response to determining that the one or more data nodes or data instances is associated with a second identifier different from the first identifier.

* * * * *